(79.)
GEORGE E. DYER.
Improvement in Stump Extractor.
No. 122,237.  Patented Dec. 26, 1871.
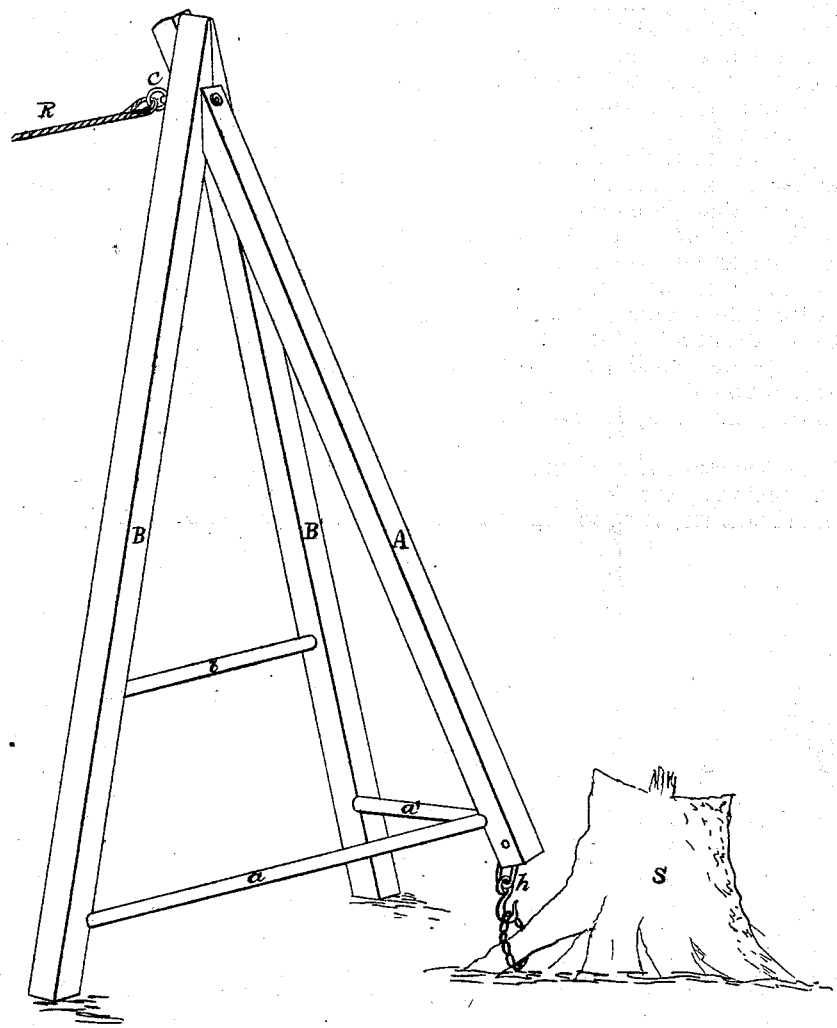

UNITED STATES PATENT OFFICE.

GEORGE E. DYER, OF NEW SHARON, MAINE.

IMPROVEMENT IN STUMP-EXTRACTORS.

Specification forming part of Letters Patent No. 122,237, dated December 26, 1871.

Specification describing a certain Improved Machine for Extracting Stones and Stumps, invented by GEORGE E. DYER, of New Sharon, county of Franklin and State of Maine.

My invention consists in so combining three upright standards and locking them together in the form of a tripod that, by securing the stump or stone by means of a chain to the foot of one of the standards and hitching the power to one end of a rope or chain, the other end of which is secured to the head of the tripod, the other two standards acting as a fulcrum, the stump or stone can be subjected to very great leverage in extracting it from the ground; and when elevated be allowed, by the peculiar form of my invention, to remain suspended until proper means of removal can be applied.

The drawing shows my invention in perspective.

A B B' are the standards mortised and locked together at their upper ends, a suitable bolt, c, being secured thereto, to which one end of rope or chain R is fastened. Connecting-rods or braces a a' are secured to standards near their lower ends or bases, while connecting-rod b is placed at sufficient elevation from the bases or standards B B' to allow the stone or stump, when extracted, to swing clear of it. A hook, h, is attached to the lower end of standard A, which, when power is applied to rope R, communicates it to the chain about the stump, and forces the stump from the ground.

I claim as my invention—

The combination of standards A B B', connecting-rods a a' b, with hook h and its chain, as and for the purpose set forth.

In testimony whereof that I claim the above I have hereunto signed my name in presence of two witnesses.

GEORGE E. DYER.

Witnesses:
 JAMES DYER,
 R. M. MANSUR. (79)